(12) United States Patent
Ding (10) Patent No.: US 12,264,774 B2
(45) Date of Patent: Apr. 1, 2025

(54) CONNECTION APPARATUS AND ELECTRONIC DEVICE

(71) Applicant: Lenovo (Beijing) Limited, Beijing (CN)

(72) Inventor: Bo Ding, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 70 days.

(21) Appl. No.: 18/181,309

(22) Filed: Mar. 9, 2023

(65) Prior Publication Data

US 2023/0304627 A1    Sep. 28, 2023

(30) Foreign Application Priority Data

Mar. 24, 2022 (CN) .......................... 202210294370.5

(51) Int. Cl.
| | |
|---|---|
| *F16M 11/18* | (2006.01) |
| *G03B 17/56* | (2021.01) |
| *H04N 23/695* | (2023.01) |

(52) U.S. Cl.
CPC .......... *F16M 11/18* (2013.01); *G03B 17/561* (2013.01); *H04N 23/695* (2023.01)

(58) Field of Classification Search
CPC ..... F16M 11/18; H04N 23/695; G03B 17/561
See application file for complete search history.

(56) References Cited

U.S. PATENT DOCUMENTS

| | | | | |
|---|---|---|---|---|
| 6,203,216 | B1 * | 3/2001 | Koizumi ................ | F16M 11/10 |
| | | | | 396/428 |
| 9,980,561 | B1 * | 5/2018 | Constantino ........... | F16M 11/08 |
| 2014/0375745 | A1 * | 12/2014 | Hoels.ae butted.ter .. | H04N 7/15 |
| | | | | 396/428 |
| 2019/0246063 | A1 * | 8/2019 | Karadayi ............... | G03B 17/02 |
| 2021/0389648 | A1 * | 12/2021 | Zhang .................... | F16M 11/08 |
| 2021/0397214 | A1 * | 12/2021 | Yamamoto ........... | F16M 11/126 |

FOREIGN PATENT DOCUMENTS

| | | | | |
|---|---|---|---|---|
| CN | 107246535 A | | 10/2017 | |
| CN | 109027556 A | | 12/2018 | |
| CN | 109027600 A | * | 12/2018 | |
| CN | 109451282 A | | 3/2019 | |
| CN | 109557745 A | * | 4/2019 | |
| CN | 209604828 U | * | 11/2019 | |
| CN | 111929972 A | * | 11/2020 | ............ B08B 1/00 |
| CN | 112212172 A | * | 1/2021 | ............ B64D 47/02 |
| CN | 112995376 A | * | 6/2021 | ............ H04M 1/026 |
| CN | 113108191 A | | 7/2021 | |
| CN | 214315450 U | * | 9/2021 | |
| CN | 114205501 A | | 3/2022 | |
| WO | WO-2009036614 A1 | * | 3/2009 | ............ F16M 11/046 |

* cited by examiner

*Primary Examiner* — Eret C Mcnichols
*Assistant Examiner* — Ding Y Tan
(74) *Attorney, Agent, or Firm* — ANOVA LAW GROUP, PLLC (57) ABSTRACT

A connection apparatus includes a first connection member configured to connect a first member of an electronic device to support the first member to make a first-type movement, and a second connection member configured to connect a second member of the electronic device to support the second member to make a second-type movement. The first connection member is at least able to make the first-type movement or the second-type movement relative to the second connection member, and the first-type movement is different from the second-type movement.

20 Claims, 2 Drawing Sheets

CONNECTION APPARATUS AND ELECTRONIC DEVICE

CROSS-REFERENCE TO RELATED APPLICATION

This application claims priority to Chinese Patent Application No. 202210294370.5, filed on Mar. 24, 2022, the entire content of which is incorporated herein by reference.

TECHNICAL FIELD

The present disclosure relates to the technical field of electronic devices and, more particularly, to a connection apparatus and an electronic device.

BACKGROUND

Conference equipment refers to a commonly used electronic device for business meetings. Electronic components in the conference equipment, such as a camera module and a control panel, etc., often adopt fixed installation structures, which degrade a photographing effect when a large number of meeting participants are present and also make it inconvenient for the meeting participants to operate the control panel.

SUMMARY

One aspect of the present disclosure provides a connection apparatus. The connection apparatus includes a first connection member configured to connect a first member of an electronic device to support the first member to make a first-type movement, and a second connection member configured to connect a second member of the electronic device to support the second member to make a second-type movement. The first connection member is at least able to make the first-type movement or the second-type movement relative to the second connection member, and the first-type movement is different from the second-type movement.

Another aspect of the present disclosure provides an electronic device. The electronic device includes an acquisition component configured to obtain images and/or audio data, an input component configured to obtain input information inputted by an operator of the electronic device, and a connection apparatus. The connection apparatus includes a first connection member configured to connect a first member of an electronic device to support the first member to make a first-type movement, and a second connection member configured to connect a second member of the electronic device to support the second member to make a second-type movement. The first connection member is at least able to make the first-type movement or the second-type movement relative to the second connection member, the first-type movement is different from the second-type movement, the acquisition component is connected to the first connection member, and the input component is connected to the second connection member.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

The reference labels in the drawings include:
100 first connection member,
101 first connector,
1011 guiding structure,
1012 first limiting structure,
1013 first sleeve shaft,
102 first movement structure,
1021 lifting structure,
1021-a fixing member,
1021-b first lifting member,
1022 first assembling structure,
1022-a second lifting member,
1022-b third lifting member,
103 second connector,
1031 second sleeve shaft,
1032 flange,
200 second connection member,
201 second movement structure,
2011 second assembling structure,
2012 rotation structure,
202 third assembling structure, and
300 buffer structure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The present disclosure provides a connection apparatus to improve a photographing effect when a large number of meeting participants are present, and to make it convenient for meeting participants to operate a control panel.

Figure 1:
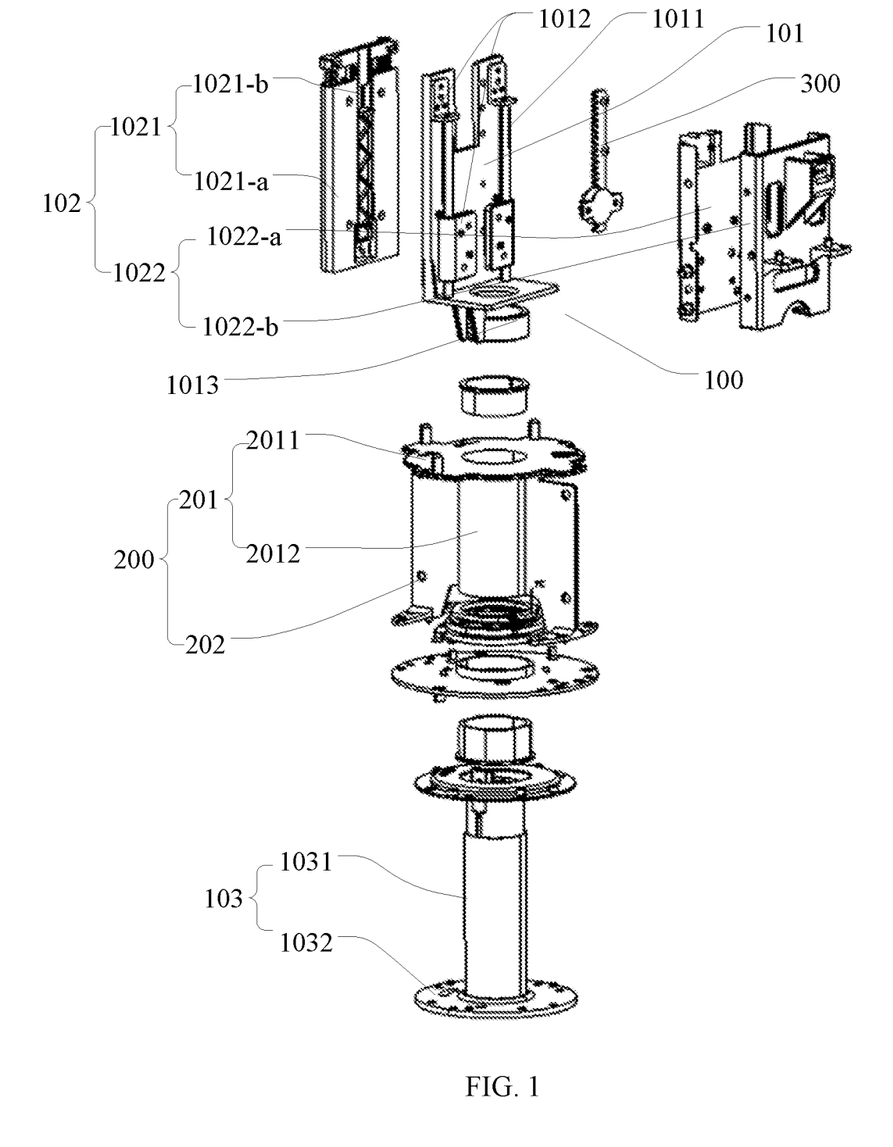
FIG. 1 is an exploded view of an exemplary connection apparatus according to some embodiments of the present disclosure.
Figure 2:
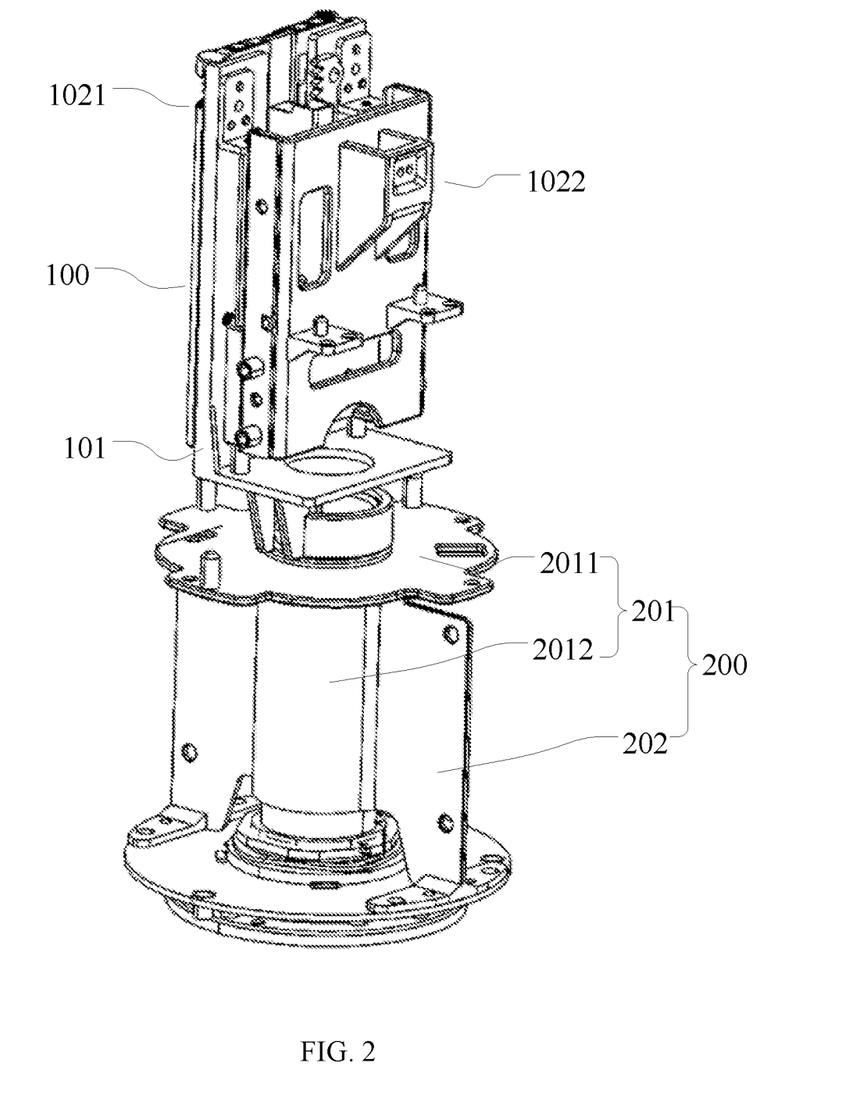
FIG. 2 is a schematic diagram of an assembled connection apparatus according to some embodiments of the present disclosure.

FIG. 1 is an exploded view of an exemplary connection apparatus according to some embodiments of the present disclosure. FIG. 2 is a schematic diagram of an assembled connection apparatus according to some embodiments of the present disclosure.

As shown in FIG. 1 and FIG. 2, the connection apparatus includes a first connection member and a second connection member 200.

The first connection member 100 is used to connect a first member of an electronic device to support the first member to perform a first-type movement. The second connection member 200 is used to connect a second member of the electronic device to support the second member to perform a second-type movement. The first connection member 100 is able to perform at least the first-type movement or the second-type movement relative to the second connection member 200. The first-type movement is different from the second-type movement.

The first-type movement may be a reciprocating linear movement or a reciprocating curved movement, and the first-type movement may be the reciprocating curved movement or the reciprocating linear movement, as long as the first-type movement and the second-type movement are different. That is, the first-type movement is the reciprocating linear movement and the second-type movement is the reciprocating curved movement, or the first-type movement is the reciprocating curved movement and the second-type movement is the reciprocating linear movement. In some embodiments, the first-type movement is the reciprocating linear movement along a height direction, that is, a lifting movement, and the second-type movement is a rotation movement. In some other movement, the first-type movement is an axial rotation movement capable of ascending and descending in the height direction, and the second-type movement is the rotation movement in a horizontal plane.

In some embodiments, the first connection member 100 is connected to a camera module of a conference equipment, such that the camera module is able to perform the lifting movement. The second connection member 200 is connected to a control panel of the conference equipment, such that the control panel is able to perform the rotation movement. In other words, the first member is the camera module and the first-type movement is the lifting movement, and the second member is the control panel and the second-type movement is the rotation movement. On one hand, when a large number of meeting participants are present, the first connection member 100 can raise up the camera module to prevent meeting participant at front seats from blocking meeting participants at back seats, thereby improving the photographing effect when a large number of meeting participants are present. On the other hand, when a meeting participant needs to operate the control panel, the second connection member 200 is able to rotate the control panel to a position facing toward the meeting participant to facilitate the meeting participant to conveniently operate the control panel. Moreover, when the conference equipment needs to be put away, the first connection member 100 is able to lower the camera module to reduce a space occupied by the conference equipment, thereby facilitating storage of the conference equipment.

In some embodiments, the conference equipment may be an interactive intelligent panel (IIP), an interactive meeting board, a smart whiteboard, a touch-board, an interactive display, or another electronic device for meetings.

In addition, the first-type movement and the second-type movement may be independent of each other, may be coordinated with each other. When the first-type movement and the second-type movement are coordinated, the first-type movement of the first connection member 100 of the connection apparatus is able to cause the second-type movement of the second connection member 200, or the second-type movement of the second connection member 200 is able to cause the first-type movement of the first connection member 100.

In some embodiments, the first connection member 100 is connected to the camera module of the conference equipment, and the second connection member 200 is connected to the control panel of the conference equipment. When the control panel makes the rotation movement, the camera module makes the lifting movement at the same time. Thus, when the control panel rotates to the position facing toward the operator, the camera module simultaneously moves up and down.

Further, the connection apparatus further includes a mode adjustment structure. The mode adjustment structure is able to switch to a coordinated mode or a non-coordinated mode according to different application scenarios. For example, under a circumstance that the conference equipment needs to be stable, the connection apparatus switches to the non-coordinated mode, such that the first-type movement and the second-type movement are independent of each other. Thus, stability of the first member is improved during the first-type movement, and stability of the second member is improved during the second-type movement. Under a circumstance that the conference equipment needs to be flexible, the connection apparatus switches to the coordinated mode, such that the first-type movement and the second-type movement are coordinated with each other. Thus, flexibility of the conference equipment is improved.

In some embodiments, the first connection member 100 is connected to a microphone module of the conference equipment, such that the microphone module can move up and down to adapt to speaking participants at different heights. The second connection member 200 is connected to the control panel of the conference equipment, such that the control panel can make the rotation movement to facilitate meeting participants at different angle positions to operate the control panel.

Further, the fist connection member 100 includes a first connector 101 and a first movement structure 102 capable of making the first-type movement relative to the first connector 101. The first movement structure 102 is connected to the first member to support the first member to make the first-type movement.

The first movement structure 102 is able to move between a first limiting position and a second limiting position relative to the first connector 101. At the first limiting position, the first member and the second connection member 200 have a first positional relationship. At the second limiting position, the first member and the second connection member 200 have a second positional relationship. The first positional relationship and the second positional relationship are different. Thus, the first member is able to move between the first limiting position and the second limiting position, thereby improving the flexibility and convenience of the electronic device.

When the first-type movement is the linear movement, the first movement structure 102 includes a lifting structure 1021 to make the first member move up and down. In some embodiments, the first limiting position is a position where the first member is closest to the second connection member 200. The first limiting position is the lowest position. The second limiting position is a position where the first member is furthest away from the second connection member 200. The second limiting position is the highest position.

The first movement structure 102 not only can stay at the first limiting position or the second limiting position, but also can stay at any position between the first limiting position and the second limiting position. In practical applications, a positioning member such as a pin or a stopper may be added to the first movement structure 102 as needed to make the first movement structure 102 stay at any position between the first limiting position and the second limiting position.

When the first-type movement and the second-type movement are coordinated, the limiting positions of the first movement structure 102 are corresponding to the limiting positions of a second movement structure 201 as described below. In some embodiments, the first limiting position and the second limiting position of the lifting structure 1021 are corresponding to the first limiting position and the second limiting position of a rotation structure 2012 described below. When the lifting structure 1021 moves to any position between the first limiting position and the second limiting position, the rotation structure 2012 is prevented from reaching one of the first limiting position and the second limiting position. However, the rotation structure 2012 does not stop rotation, but continues to rotate in conjunction with the lifting structure 1021, such that the rotation structure 2012 interferes with a second limiting structure described below or rotates by an excessive angle to stretch and damage a cable connecting between the second member and the electronic device.

For example, when the lifting movement travels a distance between 0 cm and 30 cm, a range of a rotation angle of the rotation movement is between 0° and 180°. A lowest position traveled by the lifting structure 1021 is the first limiting position. An initial rotation angle of the rotation movement corresponds to its first limiting position. That is, when the lifting structure 1021 travels to 0 cm position, the rotation structure 2012 correspondingly rotates to 0°. The lifting structure 1021 travels to the highest point at the second limiting position. The maximum rotation angle of the rotation movement corresponds to the second limiting position. That is, when the lifting structure 1021 travels to 30 cm position, the rotation structure 2012 correspondingly rotates to 180°. A coordination transmission structure is provided between the lifting structure and the rotation structure. The coordination transmission structure may be an incomplete gear and connection rod combination structure or a cam, rack and pinion combination structure. When the lifting structure 1021 ascends from 0 cm position, the coordination transmission structure correspondingly drives the rotation structure 2012 to rotate from 0° rotation angle until the lifting structure 1021 reaches 30 cm position. At that point, the rotation structure 2012 correspondingly rotates to 180° and stops.

In addition, the rotation structure 2012 and the rotation structure 1021 may be connected together. By screwing the rotation structure 2012 with a second connector 103 described below, the rotation structure 2012 is able to drive the lifting structure 1021 to spirally ascend or descend as the rotation structure 2012 rotates around the second connector 103, thereby achieving the coordination between the lifting structure 1021 and the rotation structure 2012.

In some embodiments, the first movement structure 102 is connected to the camera module to support the camera module to move up and down, such that the camera module is able to move between two limiting positions of the highest position and the furthest position. When multiple rows of meeting participants are present, the camera module of the conference equipment can be raised to capture images of the meeting participants in the back rows. Thus, the meeting participants in the front rows may not block the meeting participants in the back rows when capturing the images of the meeting participants in the back rows, and the video capture effect is improved when a large number of meeting participants are present.

Specifically, as shown in FIG. 1, the first movement structure 102 includes the lifting structure 1021 and a first assembling structure 1022.

The lifting structure 1021 includes a fixing member 1021-a disposed at a first side of the first connector 101 and a first lifting member 1021-b capable of ascending or descending relative to the fixing member 1021-a. The first lifting member 1021-b at least moves between the first limiting position and the second limiting position to drive the first member to move to the first limiting position and the second limiting position. The first assembling structure 1022 is disposed at a top of the first lifting member 1021-b and is configured to assemble the first member and the first movement structure 102 together to support the first member to move up and down.

The lifting structure 1021 may be an autonomous lifting structure 1021 that can be lifted up and lowered without external force, such as a hydraulic lifting structure, a drive motor or an electric lifting structure, or may be a passive lifting structure 1021 that can be lifted up and lowered by pressing and pulling, as long as the lifting structure 1021 meets the usage requirement. Such arrangement falls within the protection scope of the present disclosure. The present disclosure provides a specific lifting structure 1021 as described below.

For example, the fixing member 1021-a is provided with a lifting guide slot. The first lifting member 1021-b is provided with a lifting slider matching the lifting guide slot, such that the fixing member 1021-a supports the first lifting member 1021-b, and at the same time guides lifting (or ascending or descending) of the first lifting member 1021-b. In addition, the lifting structure 1021 further includes a spring arranged between the fixing member 1021-a and the first lifting member 1021-b. When the first member descends, the first member is pushed directly against the first lifting member 1021-b, such that the first lifting member 1021-b overcomes a compression force of the spring to descend to the first limiting position, and hence drives the first member to descend. When the first member ascends, the first lifting member 1021-b is directly released, such that the compression force of the spring pushes the first lifting member 1021-b to ascend to the second limiting position, and hence drives the first member to ascend. Alternatively, when the first member ascends, the first member directly pulls the first lifting member 1021-b, such that the first lifting member 1021-b overcomes a tension force of the spring to ascend to the first limiting position, and hence drives the first member to ascend. When the first member descends, the first member directly pulls the first lifting member 1021-b, such that the first lifting member 1021-b overcomes a tension force of the spring to ascend to the first limiting position, and hence drives the first member to ascend.

In addition, the first connector 101 further includes a guiding structure 1011 disposed at a second side of the first connector 101 and a first limiting structure 1012 disposed at an end of the guiding structure 1011. The second side is adjacent to or opposite to the first side. The guiding structure 1011 guides the first lifting member 1021-b, and the first limiting structure 1012 limits an end position of the first lifting member 1021-b, thereby preventing the first lifting member 1021-b from detaching (or being separated) from the guiding structure 1011.

The end position of the guiding structure 1011 refers to the end position to which the lifting structure 1021 ascends or descends. For an ascending movement, the end position is the highest position of ascending and the origination position of descending. For a descending movement, the end position is the lowest position of descending and the origination position of ascending. Thus, the first limiting structure 1012 includes a highest limiting structure and a lowest limiting structure. The highest limiting structure is used to limit the end position of ascending. The lowest limiting structure is used to limit the end position of descending. The highest limiting structure and the lowest limiting structure both may be a type of structures that can be detachably mounted on the first connector 101, such as a limiting block, an L-shape baffle, or a limiting protrusion integrally formed with the first connector 101. Any types of structures are within the scope of the present disclosure as long as such structure provides a limiting function. In some embodiments, the highest limiting structure is the L-shaped baffle bolted to the first connector 101, and the lowest limiting structure is the limiting block disposed at the first connector 101.

For example, the first lifting member 1021-*b* is able to directly slide along the guiding structure 1011, and is able to reach the first limiting position or the second limiting position when being limited by the first limiting structure 1012. In another example, the first movement structure 102 further includes a guiding member connected to the first lifting member 1021-*b*. The first lifting member 1021-*b* is able to slide along the guiding structure 1011 when being guided by the guiding member. The first lifting member 1021-*b* is able to reach the first limiting position or the second limiting position when being limited by the first limiting structure 1012, as long as the first lifting member 1021-*b* is being guided. Such arrangement falls within the protection scope of the present disclosure.

The guiding structure 1011 may be a type of structures, such as a guide post, a guide slot, a guide rail, or a guide magnetic post, as long as the type of structures meets the usage requirements. Such type of structures falls within the scope of the present disclosure.

In some embodiments, the first movement structure 102 further includes a second lifting member 1022-*a* disposed at the second side of the first connector 101. The guiding member is disposed at a side of the second lifting member 1022-*a* adjacent to the first connector 101. A first part of the first member is installed on a top of the second lifting member 1022-*a* through an additional mounting bracket, and a second part of the first member is arranged on the second lifting member 1022-*a* and is located under the first part. Thus, the second lifting member 1022-*a* is able to slide relative to the guiding structure 1011 through the guiding member, and the second lifting member 1022-*a* is coupled with the first lifting member 1021-*b* to support the first member to ascend or descend.

In some embodiments, the first movement structure 102 not only includes the second lifting member 1022-*a* disposed at the second side of the first connector 101, but also includes a third lifting member 1022-*b* connected to the second lifting member 1022-*a*. The guiding member is disposed at the side of the second lifting member 1022-*a* adjacent to the first connector 101. An accommodation space is formed between the second lifting member 1022-*a* and the third lifting member 1022-*b*. The first part of the first member is installed on the top of the second lifting member 1022-*a* and the third lifting member 1022-*b* through the additional mounting bracket, and the second part of the first member is arranged inside the accommodation space. Thus, the second lifting member 1022-*a* is able to slide relative to the guiding structure 1011 through the guiding member. Because the third lifting member 1022-*b* is connected to the second lifting member 1022-*a*, the third lifting member 1022-*b* and the second lifting member 1022-*a* slide relative to the guiding structure 1011 at the same time, and are coupled with the first lifting member 1021-*b* to support the first member to ascend or descend. In some other embodiments, the connection apparatus further includes a buffer structure 300 arranged between the first connector 101 and the first movement structure 102. The buffer structure 300 makes the first movement structure 102 move at a constant speed relative to the first connector 101.

The first member may be an electronic device such as a camera, a microphone, a speaker, or a control panel. Correspondingly, the first part may be a camera body, a microphone body, a speaker body, or control panel body, and the second part may be a power supply module of the electronic device, e.g., a power supply circuit board. Thus, the second lifting member 1022-*a* and the first lifting member 1021-*b* are coordinated to support the first part and the second part of the first member to ascend or descend at the same time.

In addition, the buffer structure 300 may be a structure such as a rack and pinion assembly, a gear chain assembly, or a friction buffer assembly to provide a buffering function. Any structure that can provide the buffering function to the first movement structure 102 and can cause the first member to move at a constant speed is within the scope of the present disclosure. In some embodiments, the buffer structure 300 is the rack and pinion assembly.

For example, the buffer structure 300 includes a gear arranged on the second lifting member 1022-*a* and a rack arranged on the first connector 101. The buffering function is achieved by meshing and rolling of the gear on the rack, such that first movement structure 102 moves at a constant speed relative to the first connector 101.

Further, the first connection member 100 further includes the second connector 103 connected to the first connector 101. The second connector 103 is further used to connect a third member of the electronic device. The third member and the first connector 101 are arranged on two opposite sides of the second connector 103, such that the third member supports the second connector 103. A relative displacement between the first connector 101 and the second connector 103 may or may not occur.

For example, the first connector 101 and the second connector 103 may be fixedly connected together through a detachable structure or a non-detachable structure, that is, no relative displacement may occur between the first connector 101 the second connector 103. In another example, the first connector 101 and the second connector 103 are slidably connected through a sliding connection structure. The relative displacement of the first connector 101 and the second connector 103 may occur through sliding, thereby making a height of the entire connection apparatus adjustable. The connection apparatus can be applied to a scenario that the height needs to be adjusted. Thus, compatibility of the connection apparatus to a height requirement is further improved, and the connection apparatus can be more widely used.

In some embodiments, the first connector is the L-shaped structure. A bottom of the L-shaped structure is provided with a first sleeve shaft 1013. The second connector 103 includes a second sleeve shaft 1031 coupled with the first sleeve shaft 1013, and a flange 1032 disposed at an end of the second sleeve shaft 1031. The flange 1032 is located at the end of the second sleeve shaft 1031 facing away from the first connector 101. The second sleeve shaft 1031 is provided with a shaft shoulder for axially positioning the first sleeve shaft 1013 and a keyway for circumferentially positioning the first sleeve shaft 1031 to improve a relative position accuracy between the first sleeve shaft 1013 and the second sleeve shaft 1031, thereby facilitating the connection between the first connector 101 and the second connector 103. After relative positions of the first sleeve shaft 1013 and the second sleeve shaft 1031 are determined, the first sleeve shaft 1013 and the second sleeve shaft 1031 are connected by bolts to achieve the detachable connection between the first connector 101 and the second connector 103. The third member and the flange 1032 are connected together by bolts to achieve the detachable connection between the third member and the second connector 103.

The third member may be a host of the electronic device or an additional supporting body, as long as it is able to support the second connector 103. In some embodiments, the third member is the host of the electronic device. On one hand, an additional support structure can be avoided and the number parts can be reduced. On the other hand, the electronic device is provided with a more compact structure and can be stored easily.

In addition, the second connection member 200 includes a second movement structure 201 capable of making the second-type movement relative to the second connector 103, such that the second movement structure 201 is able to cause the second member to make the second-type movement.

For example, the second movement structure 201 includes a second assembling structure 2011 for assembling the second member and the rotation structure 2012 rotatably connected to the second connector 103 to assemble the second member to the second assembling structure 2011. The rotation structure 2012 drives the second assembling structure 2011 to rotate, such that the second member assembled on the second assembling structure 2011 rotates accordingly.

In some embodiments, the rotation structure 2012 is able to ascend or descend when being rotated relative to the second connector 103, such that the rotation structure 2012 drives the second assembling structure 2011 to rotate and at the same time to ascend or descend. The second member is able to rotate and at the same time to ascend or descend. Thus, not only an angle of the second member but also a height of the second member can be adjusted. In some other embodiments, the rotation structure 2012 is unable to ascend or descend when being rotated relative to the second connector 103, such that the rotation structure 2012 only drives the second assembling structure 2011 to rotate. Thus, only the angle of the second member can be adjusted.

The connection apparatus may make the rotation structure 2012 move up and down during a rotation process through an additional rotating lifting structure, or the rotation structure 2012 and the first connector 101 may be designed as coordinated structures. The rotation structure 2012 may be rotated to make the first connector 101 and the rotation structure 2012 move up and down, as long as such arrangement satisfies requirements of the electronic device. As such, such arrangement falls within the scope of the present disclosure.

In some embodiments, the second assembling structure 2011 is a plate-shaped structure. A through-hole is provided in the middle of the second assembling structure for the second connector 103 to pass through, such that the second sleeve shaft 1031 is able to pass through the second assembling structure 2011 to connect to the first sleeve shaft 1013. A positioning column is provided on an upper side of the second assembling structure 2011 for positioning the second member, such that a relative positional relationship between the second member and the second assembling structure 2011 is limited to improve the assembly accuracy. The rotation structure 2012 may be a hollow cylindrical structure to be sleeved on the second sleeve shaft 1031, such that the rotation structure 2012 is able to rotate around the second sleeve shaft 1031.

In some embodiments, to minimize damages of rotation friction to the rotation structure 2012 and the second sleeve shaft 1031, a bearing capable of reducing the rotation friction may be provided on the rotation structure 2012 and the second sleeve shaft 1031, or the rotation structure 2012 and the second sleeve shaft 1031 may be made of materials with self-lubricating properties, such as nylon or a soft metal, e.g., polytetrafluoroethylene. In some other embodiments, a rotation support member made of high-strength plastic may be provided between the rotation structure 2012 and the second sleeve shaft 1031, and the a lubricating oil is applied to the rotation support member to minimize the damages caused by the friction on the rotation structure 2012 and the second sleeve shaft 1031., thereby extending a lifespan of the connection apparatus.

In some embodiments, the connection apparatus further includes the second limiting structure arranged between the second connector 103 and the second movement structure 201 to limit the rotation angle of the second member. A successively large rotation angle of the second member is prevented. The successively large rotation angle may cause damages or entanglement to the connection cable between the second member and the electronic device, thereby affecting a normal operation of the electronic device.

In some embodiments, the second limiting structure includes a first rotation limiting member detachably connected to the second movement structure 201 and a second rotation limiting member connected to the flange. The first rotation limiting member rotates with the second movement structure 201. When the first rotation limiting member rotates to a predetermined angle, a first limiting protrusion structure on the first rotation limiting member contacts with a second limiting protrusion structure on the second rotation limiting member to achieve the rotation limiting of the second movement structure 201.

In some other embodiments, the second limiting structure includes a limiting rotation flange and an elastic limiting member that are detachably connected to the second movement structure 201. The limiting rotation flange is provided with a first limiting hole. The flange 1032 at the bottom of the second connector 103 is provided with a second limiting hole. After the limiting rotation flange rotates with the second movement structure 201 to the predetermined angle, the first limiting hole aligns with the second limiting hole, and the elastic limiting member pops out to automatically snap into the first limiting hole and the second limiting hole, thereby achieving the rotation limiting of the second movement structure 201.

In addition, the second connection member 200 further includes a third assembling structure 202. The third assembling structure 202 is used to assemble a fourth member to integrate the fourth member into the second connection member 200. Thus, the electronic device is more integrated, the structure of the electronic device is more compact, and less area is occupied by the electronic device.

In some embodiments, the third assembling structure 202 includes two mounting members arranged opposite to each other along a center of the rotation structure 2012. The two mounting members extend from an outer wall of the rotation structure 2012 to a side facing away from the rotation structure 2012 along an outer normal direction of the rotation structure 2012, and each mounting member is provided with a mounting hole for installing the fourth member, such that the fourth member can be installed on the third assembling structure 202. In addition, the bottom of each mounting member is provided with a mounting part perpendicular to a plane where the mounting member is located. As such, the third assembling structure 202 and the second connector 103 are fixedly connected through the mounting members, and the fourth member installed on the third assembling structure 202 becomes a fixed structure and does not rotate with the second member. At this time, to make the second assembling structure 2011 rotate relative to the third assembling structure 202, the third assembling structure 202 and the second assembling structure 2011 are separate structures. The third assembling structure 202 and the second assembling structure 2011 are provided with the rotation support member such as sleeves or bearings to support the rotation of the second assembling structure 2011. In some other embodiments, the third assembling structure 202 and the second assembling structure 2011 are designed as one integrated structure. The third assembling structure 202 is connected with an additionally provided rotation connection member that rotates relative to the second connector 103 through the mounting members, such that the second assembling structure 2011 and the third assembling structure 202 rotate together, and both the second member and the fourth member can rotate.

In some embodiments, the fourth member is a speaker. When the third assembling structure 202 and the second assembling structure 2011 are integrally formed, the speaker assembled in the third assembling structure 202 and the control panel assembled in the second assembling structure 2011 rotate together. When the third assembling structure 202 and the second assembling structure 2011 are separately formed, the connection apparatus further includes the rotation support member arranged between the second assembling structure 2011 and the third assembling structure 202. The rotation support member may be a bearing or a connection sleeve. After the third assembling structure 202 is fixedly connected to the second connector 103, the third assembling structure 202 is further connected to the host or a support structure of the electronic device, such that the third assembling structure 202 is also fixed. Because the rotation support member is arranged between the second assembling structure 2011 and the third assembling structure 202, the second assembling structure 2011 is able to rotate relative to the second connector 103 and the third assembling structure 202. Thus, the speaker assembled in the third assembling structure 202 is fixed, and the control panel assembled in the second assembling structure 2011 is able to rotate independently, thereby facilitating the adjustment of the rotation angle of the control panel.

In addition, the present disclosure also provides an electronic device. The electronic device includes an acquisition component, in input component, and a connection apparatus disclosed above.

The acquisition component is used to obtain image and/or audio data. The input component is used to obtain input information entered by an operator. The acquisition component is connected to the first connection member 100 of the connection apparatus, and the input component is connected to the second connection member 200, such that the acquisition component is able to make the first-type movement through the connection apparatus and the input component is able to make the second-type movement through the connection apparatus.

In some embodiments, the electronic device is the conference equipment. The acquisition component is the camera module, and the input component is the control panel. The bottom of the connection apparatus is connected to the host of the conference equipment. The first connection member 100 of the connection apparatus is connected to the camera module, such that the camera module is able to move up and down. As such, the conference equipment may be applied to the application scenario a large number of meeting participants are present. The meeting participants in the front rows can be prevented from blocking the meeting participants in the back rows. The vide photographing effect can be improved when a large number of meeting participants are present. The second connection member 200 of the connection apparatus is connected to the control panel, such that the control panel is able to make the rotation movement. Thus, the meeting participants located at different angle positions can conveniently operate the control panel.

Moreover, the electronic device further includes an adjustment component. The adjustment component is electrically connected to the acquisition component, the input component, and the connection apparatus. After conference parameter information is inputted into the adjustment component through the input component, the adjustment component automatically controls the acquisition component to make the first-type movement according to the conference parameter information to adjust the position of the acquisition component, and/or automatically controls the input component to make the second-type movement according to the conference parameter information to adjust the position of the input component.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components.

Those skilled in the art should understand that unless otherwise defined, all terms (including technical terms and scientific terms) used herein have the same meanings as those of ordinary skill in the art to which the embodiments of the present disclosure belong. It should also be understood that terms, such as those defined in commonly used dictionaries, should be understood to have meanings consistent with their meaning in the context of the prior art, and unless specifically defined as herein, are not intended to be idealized or overly formalized.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not mean the order of execution, which should be determined by its functions and internal logic, and should not constitutes any limitation on the implementation in the embodiments of the present disclosure. The sequence numbers of the above embodiments of the present disclosure are for description only, and do not represent the advantages and disadvantages of the embodiments.

It should be noted that, in the specification, the term "comprising", "including" or any other variation thereof is intended to cover a non-exclusive inclusion such that a process, method, article, or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A connection apparatus, comprising:
a first connection member configured to connect a first member of an electronic device to support the first member to make a first-type movement; and
a second connection member configured to connect a second member of the electronic device to support the second member to make a second-type movement;
wherein the first connection member is at least able to make the first-type movement or the second-type movement relative to the second connection member, and the first-type movement is different from the second-type movement,
wherein the first connection member includes a first connector and a second connector, the second connector is connected to a first connector, the second connector is used to connect a third member of the electronic device, and the third member and the first connector are arranged on two opposite sides of the second connector,
wherein the first connection member further includes a first movement structure capable of making the first-type movement relative to the first connector, and
wherein the second connection member includes a second movement structure capable of making the second-type movement relative to the second connector, and the second movement structure includes a second assembling structure for assembling the second member and a rotation structure rotatably connected to the second connector.

2. The connection apparatus according to claim 1, wherein:
the first movement structure is connected to the first member to support the first member to make the first-type movement;
the first movement structure is at least able to move relative to the first connector to a first limiting position and a second limiting position;
at the first limiting position, the first member and the second connection member have a first positional relationship;
at the second limiting position, the first member and the second connection member have a second positional relationship; and
the first positional relationship is different from the second positional relationship.

3. The connection apparatus according to claim 2, wherein the first movement structure includes:
a lifting structure including a fixing member disposed at a first side of the first connector and a first lifting member capable of ascending or descending relative to the fixing member, the first lifting member at least being capable of reaching the first limiting position and the second limiting position; and
a first assembling structure configured to assemble the first member and the first movement structure together to support the first member to ascend or descend.

4. The connection apparatus according to claim 3, wherein:
the first connector further includes a guiding structure disposed at a second side of the first connector and a first limiting structure disposed at an end of the guiding structure, the second side being adjacent to or opposite to the first side;
the first lifting member slides along the guiding structure, and reaches the first limiting position or the second limiting position when being driven by the first limiting structure; or
the first movement structure further includes a guiding member connected to the first lifting member, and the first lifting member slides along the guiding structure when being driven by the guiding member and reaches the first limiting position or the second limiting position when being driven by the first limiting structure.

5. The connection apparatus according to claim 4, wherein:
the first movement structure further includes a first lifting member disposed at the second side of the first connector;
the first assembling structure is at least disposed at a top of the second lifting member to assemble a first part of the first member;
the second lifting member is further configured to assemble a second part of the first member; and
the second lifting member slides relative to the guiding structure through the guiding member to coordinate with the first lifting member to support the first member to ascend or descend.

6. The connection apparatus according to claim 4, further comprising:
a buffer structure arranged between the first connector and the first movement structure to cause the first movement structure move at a constant speed relative to the first connector.

7. The connection apparatus according to claim 1, wherein
a relative displacement between the first connector and the second connector occurs or does not occur.

8. The connection apparatus according to claim 7, wherein
the rotation structure ascends or descends relative to the second connector in a process of rotating, or does not ascend or does not descend relative to the second connector in the process of rotating.

9. The connection apparatus according to claim 8, further comprising:
a second limiting structure arranged between the second connector and the second movement structure to limit a rotation angle of the second member.

10. The connection apparatus according to claim 8, wherein:
the second connection member further includes a third assembling structure for assembling a furth member of the electronic device;
the third assembling structure and the second assembling structure are integrally formed or separately formed; and when the third assembling structure and the second assembling structure are separately formed, the second assembling structure rotates relative to the third assembling structure.

11. An electronic device, comprising:
an acquisition component configured to obtain images and/or audio data;
an input component configured to obtain input information inputted by an operator of the electronic device; and
a connection apparatus including:
  a first connection member configured to connect a first member of an electronic device to support the first member to make a first-type movement; and
  a second connection member configured to connect a second member of the electronic device to support the second member to make a second-type movement;
  wherein the first connection member is at least able to make the first-type movement or the second-type movement relative to the second connection member, the first-type movement is different from the second-type movement, the acquisition component is connected to the first connection member, and the input component is connected to the second connection member,
  wherein the first connection member includes a first connector and a second connector, the second connector is connected to a first connector, the second connector is used to connect a third member of the electronic device, and the third member and the first connector are arranged on two opposite sides of the second connector,
  wherein the first connection member further includes a first movement structure capable of making the first-type movement relative to the first connector, and
  wherein the second connection member includes a second movement structure capable of making the second-type movement relative to the second connector, and the second movement structure includes a second assembling structure for assembling the second member and a rotation structure rotatably connected to the second connector.

12. The electronic device according to claim 11, wherein:
the first movement structure is connected to the first member to support the first member to make the first-type movement;
the first movement structure is at least able to move relative to the first connector to a first limiting position and a second limiting position;
at the first limiting position, the first member and the second connection member have a first positional relationship;
at the second limiting position, the first member and the second connection member have a second positional relationship; and
the first positional relationship is different from the second positional relationship.

13. The electronic device according to claim 12, wherein the first movement structure includes:
a lifting structure including a fixing member disposed at a first side of the first connector and a first lifting member capable of ascending or descending relative to the fixing member, the first lifting member at least being capable of reaching the first limiting position and the second limiting position; and
a first assembling structure configured to assemble the first member and the first movement structure together to support the first member to ascend or descend.

14. The electronic device according to claim 13, wherein:
the first connector further includes a guiding structure disposed at a second side of the first connector and a first limiting structure disposed at an end of the guiding structure, the second side being adjacent to or opposite to the first side;
the first lifting member slides along the guiding structure, and reaches the first limiting position or the second limiting position when being driven by the first limiting structure; or
the first movement structure further includes a guiding member connected to the first lifting member, and the first lifting member slides along the guiding structure when being driven by the guiding member and reaches the first limiting position or the second limiting position when being driven by the first limiting structure.

15. The electronic device according to claim 14, wherein:
the first movement structure further includes a first lifting member disposed at the second side of the first connector;
the first assembling structure is at least disposed at a top of the second lifting member to assemble a first part of the first member;
the second lifting member is further configured to assemble a second part of the first member; and
the second lifting member slides relative to the guiding structure through the guiding member to coordinate with the first lifting member to support the first member to ascend or descend.

16. The electronic device according to claim 14, wherein the connection apparatus further includes:
a buffer structure arranged between the first connector and the first movement structure to cause the first movement structure move at a constant speed relative to the first connector.

17. The electronic device according to claim 11, wherein a relative displacement between the first connector and the second connector occurs or does not occur.

18. The electronic device according to claim 17, wherein the rotation structure ascends or descends relative to the second connector in a process of rotating, or does not ascend or does not descend relative to the second connector in the process of rotating.

19. The electronic device according to claim 18, wherein the connection apparatus further includes:
a second limiting structure arranged between the second connector and the second movement structure to limit a rotation angle of the second member.

20. The electronic device according to claim 18, wherein:
the second connection member further includes a third assembling structure for assembling a furth member of the electronic device;
the third assembling structure and the second assembling structure are integrally formed or separately formed; and
when the third assembling structure and the second assembling structure are separately formed, the second assembling structure rotates relative to the third assembling structure.

* * * * *